Jan. 13, 1925.

M. M. BORDEN 1,522,490

FLOW CONTROLLER

Filed Sept. 8, 1922

Inventor:
Moro M. Borden,

By
Attorneys

Patented Jan. 13, 1925.

1,522,490

UNITED STATES PATENT OFFICE.

MORO M. BORDEN, OF COLLINGSWOOD, NEW JERSEY, ASSIGNOR TO SIMPLEX VALVE & METER COMPANY, OF PHILADELPHIA, PENNSYLVANIA, A CORPORATION OF NEW JERSEY.

FLOW CONTROLLER.

Application filed September 8, 1922. Serial No. 586,894.

*To all whom it may concern:*

Be it known that I, MORO M. BORDEN, a citizen of the United States, residing at Collingswood, in the county of Camden and State of New Jersey, have invented certain Improvements in Flow Controllers, of which the following is a specification.

This invention is an automatic mechanism for regulating the flow of liquids through conduits to predetermined rates and its primary object is to secure automatically the desired predetermined rate of flow by simple means that are readily adjustable and reliable in operation in response to variations in the head inducing the flow.

My improved mechanism, in the preferred construction, is applied to a conduit which is provided with a contracted or venturi section having a butterfly valve therein, in combination with a shell divided by a diaphragm into chambers connected respectively with conduit sections of different diameters and a lever mechanism fixed to the valve at the axis thereof, with which lever mechanism the diaphragm and a variable liquid counter weight are connected in counter acting relation so that as the pressures in the chambers change with changes in the rate of flow the diaphragm will be moved by the resultant to adjust the valve, restricting the passage controlled thereby as the difference in pressures increases and enlarging such passage as this difference decreases.

Figure 1:
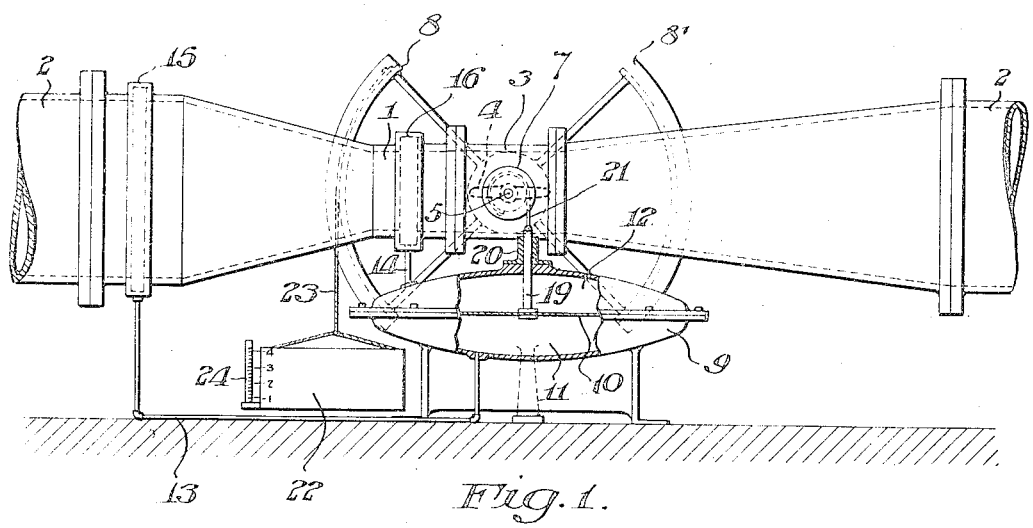
Figure 2:
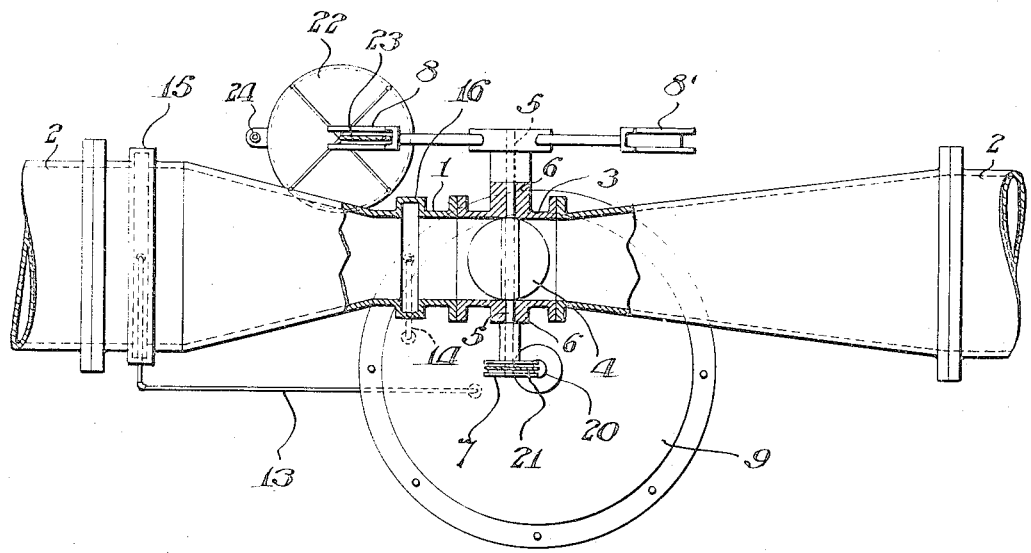

In the accompanying drawings, Fig. 1 is a broken side view of mechanism embodying my improvements, and Fig. 2 is a fragmentary plan view illustrating details shown in Fig. 1 with the throat of the contracted section broken away.

The mechanism illustrated to show a preferred application of the invention comprises a conduit having a Venturi section I between the normal sections 2. The Venturi section has in its throat the valve case 3 containing the butterfly valve 4 adapted to oscillate on a horizontal axis, the trunnions 5 of the valve being journalled in the bearings 6 on the case. A sheave 7 is fixed to one of these trunnions and counterbalancing sheave segment 8 and 8' are fixed similarly to the other trunnion.

A shell 9 contains a diaphragm 10 which divides it into compartments 11 and 12. These compartments are connected by the respective pipes 13 and 14 with the section 15 and the smaller section 16 of the conduit. The diaphragm is connected at its center with a stem 19 which passes through a stuffing box 20 of the shell to a connection with a cord or strap 21 passing over and fixed to the sheave 7.

A vessel 22 is suspended by a cord or strap 23 from the sheave section 8 so as to act counter to the weight carried by the cord 21, the vessel being provided with a graduated glass 24 to show the depth of a liquid therein.

In operation, the vessel 22 will be provided with the amount of liquid, indicated by the gage, that is required to hold the valve 4 in the desired position, against the counter action of the diaphragm 10 and its connections when the liquid in the conduit is not flowing or when there is no draft on the contents of the filled conduit. When there is a draft made on the liquid, the resulting flow causes unequal pressures to be exerted in the chambers 11 and 12, the pressure communicated from the section 15 being greater than that communicated from the section 16 and the difference increasing with the velocity of flow or the increase in the head.

Having described my invention, I claim:

In a flow controller, the combination with a conduit and a butterfly valve therein, of sheave mechanisms connected with said valve to effect adjustments thereof, mechanism comprising a diaphragm connected with one of said sheave mechanisms, a vessel adapted for holding and indicating a quantity of liquid connected with the other of said sheave mechanisms in counterbalancing relation to said diaphragm, and means for producing differential pressures from the fluid flowing in said conduit and variable therewith and applying said pressures to the opposite sides of said diaphragm whereby said valve is adjusted.

In testimony whereof I have hereunto set my name this 31st day of August, 1922.

MORO M. BORDEN.